June 8, 1965 M. H. KRAINES 3,188,143
TIRE TRIM MEMBER
Filed Sept. 28, 1962

INVENTOR.
MAURICE H. KRAINES
BY Fulwider, Patton, Rieber,
Lee, and Utecht
ATTORNEYS 3,188,143
TIRE TRIM MEMBER
Maurice H. Kraines, 4708 Monteith Drive,
Los Angeles 43, Calif.
Filed Sept. 28, 1962, Ser. No. 226,980
4 Claims. (Cl. 301—37)

The present invention relates to protective and decorative trim members for attachment to automobile pneumatic tire and wheel assemblies.

In the production of such trim members, it is sometimes desired for decorative purposes to form the trim member in contrasting colors; for example, the radially inward part of the member may form an annular portion of conventional black color substantially conforming to the color of the side wall of the tire, and integrally joined to this annular black color portion may be a radially outward annular portion of a contrasting lighter color such as conventional white wall color, although pastel shades may also be used to harmonize the tire trim with the color of the car. In molding the trim member in dissimilar colors, difficulty has been encountered in limiting the relative flow of the two differently colored materials with respect to a surface of the trim member. Thus, for example, the exposed front surface can be easily controlled so that there is a sharp line of demarcation between the contrasting colors but difficulty has been experienced with the material being molded flowing in a plastic condition onto the back surface of the cooperating portion where it unduly thickens the wall of the member and destroys its curvature so that the finished trim member will not tightly grip the automobile tire on which it is mounted and the outer edge thereof fails to seal against the tire wall.

According to the present invention, this difficulty is overcome by preforming one portion of the trim member and providing the back surface of this preformed portion with an annular bead which serves to limit flow of the material being added to the preformed portion, thus maintaining the added material within the area desired.

It is, therefore, an object of the present invention to provide an improved trim member for automobile tires formed in contrasting colors.

Another object of this invention is an improved method of forming a trim member for automobile tires having contrasting colored portions in concentric annular relation.

A further object of this invention is the provision of a contrasting colored trim member for automobile tires whose outer edge firmly seals against the tire wall.

A still further object of this invention is the provision of an improved trim member for automobile tires of contrasting annular colors wherein the demarcation between the materials forming the separately colored portions is accurately controlled.

These and other objects and features of the invention will be readily apparent to those skilled in the art from the following specification and the appended drawing, in which.

Figure 1:
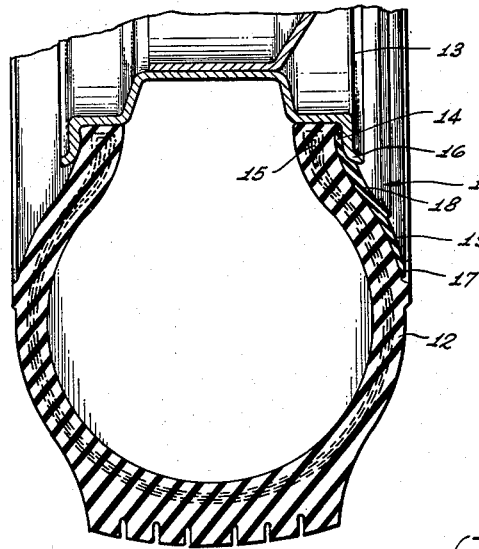
FIGURE 1 is a sectional view showing a trim member according to the present invention mounted on a tire and wheel assembly.

In FIGURE 1 of the drawing a trim member 11 according to the present invention is shown assembled in operative position with a tire 12 and an automobile wheel 13.

The radially inwardmost ring 14 of the trim member 11 is disposed between the tire bead 15 and the wheel side flange 16, being clamped therebetween as the tire 12 is inflated. The radially outermost edge 17 of the trim member 11 sealably engages the side wall of the tire 12 to prevent the entrance of dirt, water and other foreign matter therebetween.

The trim member 11 in the illustrated embodiment includes a radially inward, annular portion 18 colored in the conventional black side wall color of the tire 12, and a radially outward annular portion 19 which is of a contrasting color, for example white. The dark colored annular portion 18 terminates outwardly in an annular bead 21 on its front surface which divides the main body of the portion 18 from the light colored portion 19, and the dark colored portion 18 extends radially inwardly, through the reverse curvature shown in the drawing, into the extreme radially inward ring 14 which is clamped between the tire bead 15 and the wheel flange 16.

Figure 2:
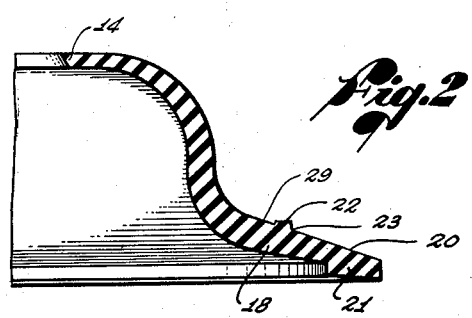
FIGURE 2 is a sectional view showing a preformed portion of the trim member.
Figure 4:
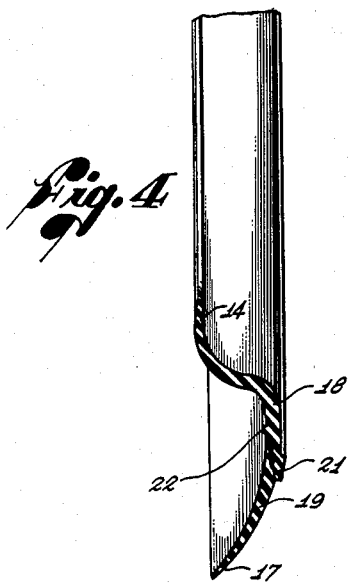
FIGURE 4 is a sectional view through the completed trim member prior to its mounting on a tire and wheel assembly.

In manufacturing the trim member according to the present invention, the black wall colored portion 18 of FIGURE 2 is preformed in a complementarily shaped mold from known natural or synthetic rubber-base material having the proper pigmentation therein to secure the desired dark color in the final product. There is provided on the radially outwardmost portion of its back surface an inclined or substantially frusto-conical surface 20 to which the light colored portion 19 is to be joined. There is also molded on the back surface of the preformed portion 18 a projecting annular bead or ridge 22, the edge 23 of which is located at the radially inward edge of the surface 20 to define the limit of flow of the contrasting light colored portion 19 of the trim member. The preformed portion 18 illustrated in FIGURE 2 may be either fully cured or semicured in the mold, as desired.

Figure 3:
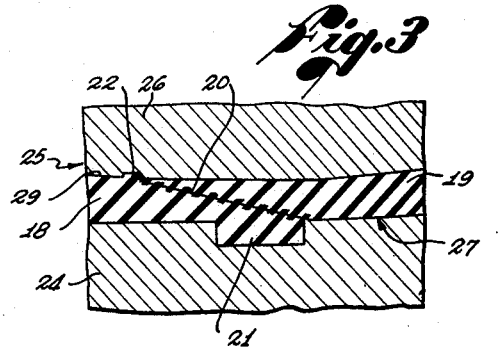
FIGURE 3 is a partial sectional view showing the molding of the radially outward portion of the trim member on the preformed portion of FIGURE 2.

The preformed portion 18 is then placed in the lower part 24 of a final mold, indicated generally at 25 in FIGURE 3, and including an upper part 26 cooperating with the lower part 24 to define a molding space therebetween. With the preformed portion 18 disposed in the lower mold part 24, strips of light colored stock having suitable white or other color pigmentation therein are laid in the mold in the space indicated at 27 in FIGURE 3. The mold parts are heated according to conventional practice, and the mold part 26 is moved downwardly toward the part 24 under relatively high pressure, whereupon the light colored material at 27 becomes plastic and flows into the shape of the mold space provided between the mold parts 24 and 26. As the portion 19 of the trim member is thus formed, its flow radially inwardly of the preformed portion 18 is limited by its engagement with the bead or ridge 22 on the back surface of the portion 18.

In the final molding operation the light colored portion 19 is integrally adhered to the preformed dark colored portion 18 at the surface 20 therebetween. In this operation the portion 19 is completely cured, as is the portion 18 if it was only semi-cured in the preforming operation.

The light colored material forming the portion 19 of the trim member becomes plastic prior to complete closure of the mold parts 24, 26 and in the absence of the dam provided by the annular bead 22 tended to flow radially inwardly onto the surface 29 of the preformed portion 18. This portion of the trim member was unduly thickened and tended to flatten out, so that the completed trim member no longer closely adhered to the wall of the tire with which it was assembled, and the outer edge 17 of the trim member did not seal against the tire wall to exclude foreign matter from entrance therebetween. However, with the annular bead or ridge 22, the flow of the material forming the radially outward light colored portion 19 of the trim member is limited to the inclined or frusto-conical surface 20 by the edge 23 of the bead 22, which thereby serves as a dam to limit the radially inward movement of the material when in a plastic condition. The thickness and curvature of the trim member adjacent the surface 29 are thus maintained the same as provided by the preform molding of the portion 18.

While a certain preferred embodiment of my invention and the method of forming it have been specifically shown and described herein, it is to be understood that the invention is not limited thereto, as many variations will be apparent to those skilled in the art, and the invention is to be given its broadest interpretation within the terms of the following claims.

I claim:

1. A side wall trim member for a mounted automobile tire comprising: a radially inward annular portion of a rubber-base material of a dark color substantially conforming to the color of the tire side wall, the radially inward edge of said portion being dimensioned to be clamped between the tire and the wheel on which it is mounted with said portion extending outwardly over the front side of the tire; a radially outward annular rubber-base material portion integrally joined to said radially inward portion along a substantially rearwardly facing surface on said radially inward portion; and having a contrasting lighter color; an annular bead on the front surface of said dark colored portion at the radially outward edge thereof and extending forwardly of the planes of both said portions; and an annular bead on the back surface of said dark colored portion and defining the radially inward limit of said light colored portion.

2. A side wall trim member for a mounted automobile tire comprising: a radially inward annular portion of a rubber-base material of a dark color substantially conforming to the color of the tire side wall, the radially inward edge of said portion being dimensioned to be clamped between the tire and the wheel on which it is mounted with said portion extending outwardly over the front side of the tire; a radially outward annular rubber-base material portion integrally joined to said radially inward portion and having a contrasting lighter color, said portions being joined together along a surface inclined from the radially outward edge of the dark colored portion inwardly and toward the back surface thereof so as to face substantially rearwardly; and an annular bead projecting from the back surface of said dark colored portion at the junction of its back and joining surfaces and serving as a dam to limit radially inward movement of the light colored material.

3. A side wall trim member for a mounted automobile tire comprising: a radially inward annular portion of a rubber-base material of a dark color substantially conforming to the color of the tire side wall, the radially inward edge of said portion being dimensioned to be clamped between the tire and the wheel on which it is mounted with said portion extending outwardly over the front side of the tire; a radially outward annular portion of a rubber-base material integrally joined to said radially inward portion along a substantially rearwardly facing frusto-conical surface thereof greater in width than the thickness of the member, said radially outward annular portion having a contrasting lighter color than the radially inward annular portion; and an annular bead on the back surface of said dark colored portion and spaced from the radially outward edge thereof to provide a dam at the radially inward edge of said frusto-conical joining surface to prevent radially inward flow therepast of the light colored material of the radially outward portion.

4. A side wall trim member for a mounted automobile tire comprising: a radially inward annular portion of a rubber-base material of a dark color substantially conforming to the color of the tire side wall, the radially inward edge of said portion being dimensioned to be clamped between the tire and the wheel on which it is mounted with said portion extending outwardly over the front side of the tire; a radially outward annular portion of a rubber-base material integrally joined to said radially inward portion along a substantially rearwardly facing frusto-conical surface thereof greater in width than the thickness of the member, said radially outward annular portion having a constrasting lighter color than the radially inward annular portion; an annular bead on the front surface of said dark colored portion adjacent the radially outward edge thereof and projecting forwardly of the planes of both said portions; and an annular bead on the back surface of said dark colored portion and spaced from the radially outward edge thereof to provide a dam at the radially inward edge of said frusto-conical joining surface to prevent radially inward flow therepast of the light colored material of the radially outward portion.

References Cited by the Examiner
UNITED STATES PATENTS

| | | | |
|---|---|---|---|
| 1,940,077 | 12/33 | Coe | 152—353 |
| 2,031,720 | 2/36 | Lee. | |
| 2,731,060 | 1/56 | Rowe | 156—90 X |
| 2,737,422 | 3/56 | Barnes | 301—37 |
| 2,822,219 | 2/58 | Billingsley | 301—37 |
| 2,865,054 | 12/58 | Constantakis. | |
| 2,996,334 | 8/61 | Aske | 301—37 |
| 3,041,674 | 7/62 | Spencer et al. | 264—162 |

ARTHUR L. LA POINT, *Primary Examiner.*
ROBERT C. RIORDIN, *Examiner.*